UNITED STATES PATENT OFFICE.

SAMUEL McKIRAHAN, OF GOLDEN, COLORADO, ASSIGNOR, BY DIRECT AND MESNE ASSIGNMENTS, OF TWO-THIRDS TO F. A. FULLER, OF DENVER, COLORADO.

EXTRACTION OF POTASSIUM FROM THE NATURAL SUBSTANCES IN WHICH IT OCCURS.

1,388,276.  Specification of Letters Patent.  Patented Aug. 23, 1921.

No Drawing.  Application filed February 14, 1918. Serial No. 217,280.

*To all whom it may concern:*

Be it known that I, SAMUEL McKIRAHAN, a citizen of the United States, residing at Golden, in the county of Jefferson and State of Colorado, have invented certain new and useful Improvements in the Extraction of Potassium from the Natural Substances in Which It Occurs, of which the following is a specification.

This invention relates to a process of extracting potassium from the natural substances in which it occurs, and its primary object is to provide a very simple, inexpensive and highly effective method of producing any desired salt of potassium from natural potassium-bearing substances such as feldspars, leucites, glauconites, sericites and other silicate rocks or their derivatives.

Another object of my invention is to provide a method of simultaneously extracting potassium and other metallic contents from natural substances in which they occur.

My process consists in mixing with the natural potassium-bearing substance in a finely comminuted condition, a sufficient quantity of fluorspar ($CaF_2$) to effect the volatilization of practically all the potassium contained in the substance, when the mixture is heated to a high temperature.

The fumes derived from this action contain the potassium contents of the substance under treatment, combined with the fluorin of the fluorspar as potassium fluorid (KF), together with other gases formed by the combustion of the fuel such as carbon dioxid ($CO_2$) and sulfur dioxid ($SO_2$) etc.

The potassium fluorid and whatever other soluble gaseous compounds may be present in the fumes, are subsequently brought in solution by any suitable method, after which the potassium salts are recovered from the solution by evaporation, crystallization, decantation, filtration or any other suitable process.

In this connection I desire it understood that while the recovery of the potassium salts from the volatile product of the initial step of my process, by solution, is preferred as being most suitable for the purpose, any other known method of recovering the desired salts may be used within the spirit of my invention.

In order to eliminate the fluorin from the potassium fluorid while in solution, any calcium compound is added to effect a reaction of the fluorin with the calcium, thereby forming the insoluble calcium fluorid ($CaF_2$) which may be separated from the solution by precipitation, decantation or filtration.

The calcium compound by which the fluorin is eliminated from the potassium fluorid is preferably selected with the view of obtaining potassium salts of marketable value.

In the event of the substance under treatment containing gold, silver, or other metal or metals in sufficient quantities to render their extraction desirable, chlorin or any chlorin-containing compound such as sodium-chlorid (NaCl), calcium chlorid ($CaCl_2$), and others, is added to the mixture of comminuted matter and fluorspar before or while it is heated, in a quantity sufficient to form a chlorid with the metal or metals present in the ore. The volatilized metal chlorids pass off as a fume and are collected by passing them successively through a cooler and a precipitator or by any other suitable method.

This process of extracting the metallic contents of the material under treatment is, however, independent of that of extracting the potassium as hereinabove described, and has been made the subject of a separate application for patent, Ser. No. 217,279 filed Feb. 14, 1918.

The percentage of fluorspar mixed with the finely divided natural substance in the initial step of the process should be sufficiently high to effect the volatilization of practically all the contained potassium, it having been found that in most instances a quantity of fluorspar substantially equal to the potash ($K_2O$) contents of the substance brings the most satisfactory results.

The temperature to which the mixture of material and fluorspar is heated should be sufficiently high to effect the volatilization of the potassium present, a temperature of not less than 1000 degrees centigrade being desirable.

Having thus described my improved process of recovering potassium salts from potassium-bearing natural substances, I desire it understood that I am aware that the use of fluorspar for the recovery of potassium salts from a cement mix composed of

25% feldspathic rock and 75% limestone, is old in the art and that in fact it has long been known to those versed in this branch of science that fluorspar has certain properties which render it valuable to increase the percentage of potassium volatilized in the manufacture of Portland cement.

Every known use of fluorspar in this capacity, has, however, been based on the universally accepted theory that the fluorspar is of value in the volatilization of potassium only as an aid to and with lime or limestone in the above-named proportion of the rock, and I claim to be the first to have discovered the fact that fluorspar is adapted for the extraction of potassium directly from the natural substance in which it occurs, without the addition of lime, limestone or other ingredients, if used in the proper proportion in intermixture with the material in a finely divided condition, and heated to the required temperature.

What I claim and desire to secure by Letters-Patent is:

1. The process of extracting potassium from natural substances in which it occurs, consisting in mixing with non-calcic silicate rock carrying potassium compounds, a quantity of finely-divided fluorspar ($CaF_2$) exclusive of any other agent or agents, heating the mixture to volatilize the potassium as potassium fluorid (KF), and recovering the potassium salts from the volatile product.

2. The process of extracting potassium from natural substances in which it occurs, consisting in mixing with non-calcic silicate rock carrying potassium compounds, a quantity of finely-divided fluorspar ($CaF_2$) substantially equal to the potash contents of the rock, heating the mixture to volatilize the potassium as potassium fluorid (KF), and recovering the potassium salts from the volatile product.

3. The process of extracting potassium and other metals from the natural substances in which they occur, consisting in mixing with the substance in a finely divided condition, a quantity of fluorspar ($CaF_2$) and a quantity of sodium chlorid, heating the mixture to simultaneously volatilize the potassium contents of the substance as potassium fluorid and the metallic contents of the same as a chlorid of the metal or metals, and recovering the potassium salts and the chlorid of the metal or metals from the volatile product.

In testimony whereof I have affixed my signature in presence of two witnesses.

SAMUEL McKIRAHAN.

Witnesses:
F. A. FULLER,
G. J. ROLLANDET.